United States Patent [19]

Rao et al.

[11] 4,212,608

[45] Jul. 15, 1980

[54] METHOD AND APPARATUS FOR THE PRODUCTION OF MOLD BODIES

[75] Inventors: Chatty Rao, Bergisch Gladbach; Bruno Schmitz, Cologne, both of Fed. Rep. of Germany

[73] Assignee: Klöckner-Humboldt-Deutz AG, Fed. Rep. of Germany

[21] Appl. No.: 923,695

[22] Filed: Jul. 11, 1978

[30] Foreign Application Priority Data

Jul. 14, 1977 [DE] Fed. Rep. of Germany ....... 2731831

[51] Int. Cl.² .......................... B29C 1/00; B29C 25/00
[52] U.S. Cl. .................................... 425/85; 425/404; 425/405 R; 425/445; 425/436 R; 425/DIG. 60
[58] Field of Search ................... 425/78, 84, 85, 332, 425/333, 363, 383, 197, 209, 222, 373, DIG. 60, 404, 405, 436, 445; 264/5, 17, 86, 87, 91, 117, 119, 320; 210/401, 68; 209/233, 268, 629, 632, 673, 361

[56] References Cited

U.S. PATENT DOCUMENTS

| | | | |
|---|---|---|---|
| 1,261,054 | 4/1918 | Paramor | 209/268 |
| 2,966,267 | 12/1960 | Dunbar | 209/271 |
| 2,988,781 | 6/1961 | Meyer | 209/673 |
| 3,438,491 | 4/1969 | Haley et al. | 209/673 |
| 3,704,788 | 12/1972 | Goodman et al. | 210/401 |
| 3,743,100 | 7/1973 | Bähr | 210/401 |
| 4,102,502 | 7/1978 | Vaplon et al. | 209/673 |

Primary Examiner—W. E. Hoag
Attorney, Agent, or Firm—Hill, Van Santen, Steadman, Chiara & Simpson

[57] ABSTRACT

Method and apparatus for the production of molded bodies which are shaped by means of a filtration-dehydration process wherein such bodies after shaping are subjected to a rolling movement preferably by means of a roller conveyor to strengthen and homogenize the same before being further processed.

6 Claims, 2 Drawing Figures

METHOD AND APPARATUS FOR THE PRODUCTION OF MOLD BODIES

DESCRIPTION

The invention relates to a method and an apparatus for the production of mold bodies from mold-bodies already pre-formed, especially pre-formed mold bodies whose shaping takes place upon the filtration-dehydration.

It is known that the mold bodies often pass through long transportation paths before they arrive at the processing steps connected in series. Both the type of the further processing as well as also the transporting require a least amount of strength of the mold bodies.

The object serving as basis for the invention is to furnish a method and an apparatus for the production of mold bodies with which mold bodies of great strength and homogeneousness may be produced. This object is solved thereby that the mold bodies, after their shaping are subjected to a rolling movement for the strengthening and homogenization. The mold bodies are accordingly subjected after their formation to a rolling or turn-about movement, respectively, whereby a continuous compression is attained, and with it a strengthening or homogenization, respectively. In this connection, edges and seams or ridges are rounded off, so that the capacity for resistance to rubbing and other mechanical stresses is increased. However, the basic geometrical shaping or basic form occasioned by the particular type of production remains attained. This basic shape may therefore be selected with reference to the special purpose of use of the mold body, whereby as criteria for decision for example in connection with a blast-furnace process, the incline- or conduit-profile, respectively and/or the flow-through behavior of a heap or feed formed of these mold bodies come into consideration. In this connection, during the rolling movement in each case in dependence upon the type or composition of the mold body a supply of binder may take place.

In accordance with an advantageous embodiment of the invention, the strengthened and homogenized mold bodies are subsequently subjected to a structural granulation. The mold bodies serve in this case as starting material of a granulation process connected in series, which proceeds in known manner. In this connection it may be a question both of a pelletizing-process as well as also of a sintering- or briquetting-process. A granulation process, particularly a pelletizing process brings with it high mechanical stresses, which, however, on account of the special pretreatment of the mold bodies are borne almost without mutilations or occurrence of fine grains. The treatment of mold bodies aiming at a strengthening or homogenization, respectively, the latter being for example recovered by means of filtration-dehydration, therefore improves their possibilities of utilization in granulation processes.

Further features and advantages of the invention will result from the following embodiment by way of example, shown diagrammatically in the drawing.

Figure 1:
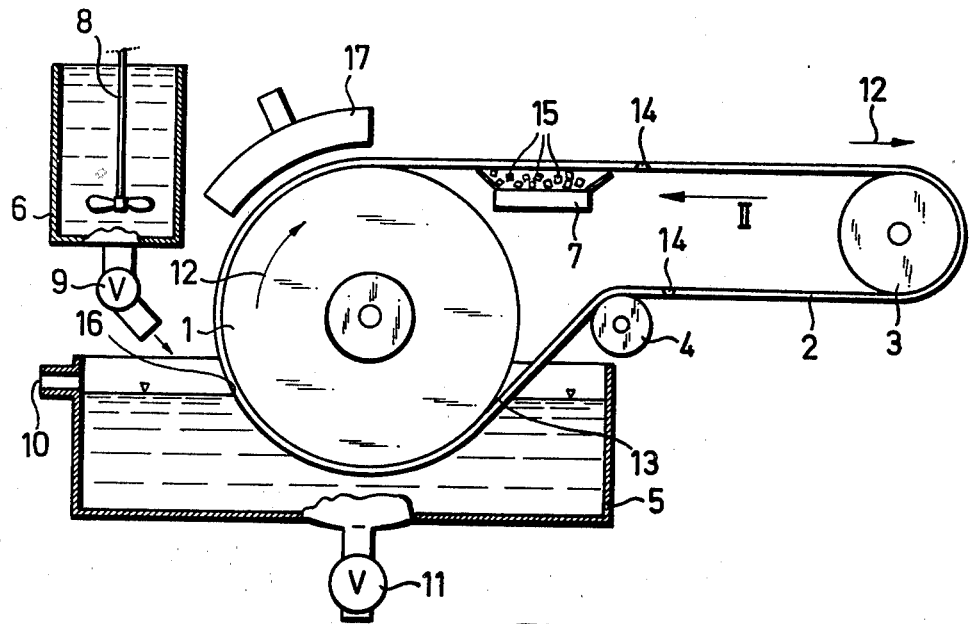
FIG. 1 shows a side view of a filter drum with a roller device according to the invention.

In detail, FIG. 1 shows a filter drum 1, a molding belt 2, a counterroller 3, a guide roller 4, a filter trough 5, a slurry-charging apparatus 6 as well as a conveyor means 7.

The slurry charging apparatus 6 is in known manner provided for the prevention of a sedimentation with an agitator device 8 and has in the lower area an outlet-regulating member 9. The filter trough 5 is provided with an overflow opening 10 and an outlet regulating member 11.

From the slurry charging apparatus 6, the slurry, if need be mixed with a binder, by means of the outlet-regulating-member 9 is supplied in such quantity, that its level in the filter trough 5 remains about constant. The molding belt 2 moved in direction of the arrow 12, at the point 13, dips into the slurry of the filter trough 5. At thi point 13, commences the suction effect of the filter-drum 1, so that grid-type openings 14 in the molding belt 2 fill with slurry and in this manner, mold bodies 15 result. The actual dehydration phase starts with the emergence of the molding belt 2 out of the slurry at the point 16, whereby this mechanical dehydration is supplemented in advantageous manner by means of a thermal dehydration. For this thermal dehydration is used a drying apparatus 17, which is disposed in the upper area of the filter-drum 1.

The mold bodies 15 being released from the molding belt 2—by means of the conveyor medium 7 which is constructed as roller-conveyor—and viewed in direction of movement of the molding belt 2—is connected in series directly to the filter-drum 1,—are collected, homogenized, strengthened and transported away.

Figure 2:
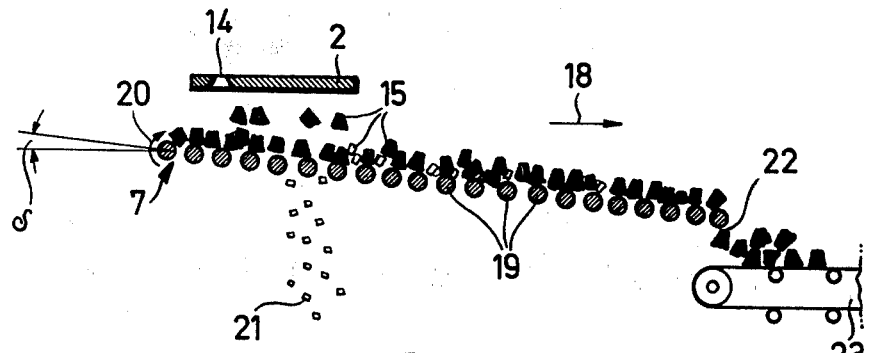
FIG. 2 shows a view according to II in FIG. 1, in partially cut-away showing.

As FIG. 2 shows, the roller conveyor 7, whose direction of feed is indicated by the arrow 18, is inclined at the angle advantageously between 0° and 20° to the horizontal, whereby the diameter of the rollers amounts to 15 mm to 150 mm and the gap width between the rollers to 0 mm to 10 mm. The roller conveyor has in addition to the transporting and strengthening function also a classification function. In this connection, the operating parameters of the roller conveyor must be viewed in connection with the size of the mold bodies released from the molding belt, whose degrees of size lie between 1 mm and 30 mm. Too small a roller diameter in relation to the size of the mold body at given gap width would have as a result a less intensive roller movement, so that the strengthening result would be diminished, while too strong an enlargement of the roller diameter with otherwise unchanged conditions would impair the conveying effect of the roller conveyor. In the latter case, the spaces present between the rollers would be filled with mold bodies which, however, could not be taken out of these spaces and transported further. The inclination of the roller conveyor and the speed of the rollers are the determining factors for the duration time of the mold-bodies on the roller conveyor and therewith for the quality of the strengthening and the throughput. By means of the gap width between the rollers, the size of the smallest still permissible mold body is determined. It was found that in the case of the computation of data according to the invention, the strengthening result at high throughput, and a relatively small portion of rubbed and destroyed mold bodies is at the optimum.

The mold bodies 15 released from the grid-type openings 14 of the molding belt 2 drop onto the rollers 19 of the roller conveyor, which rotate in direction of the arrow 20. In this connection an eventually occurring fine-grain-portion 21 is separated off through the gap existing between the rollers 19, and after suitable preparation of the slurry charging apparatus 6 again supplied for renewed utilization. The mold bodies 15 undergo during their transport over the roller conveyor 7 a rolling or turning movement, respectively, and undergo in this manner a compression and a strengthening. The strengthened mold bodies 15 drop at the point 22, freed from portions of fine grain, to a belt conveyor 23 which guides then to processing steps connected in series.

The roller conveyor may in case of need be provided with a feed or suply device for a solid or liquid binder, which is sprayed or dusted, respectively, on the rollers. Thru this measure, the strength of the produced mold bodies is further improved and their surface moisture regulated within desired limits.

For the adaptation to changing conditions of operation, the roller conveyor very advantageously may be equipped with a drive of known construction, variable as to rate of rotation, as well as constructed adjustably in its angle of inclination $\delta$ and its gap width. It is also of especial advantage to conceive the drive of the roller conveyor so that the rate of rotation of each roller is adjustable independently of the rate of rotation of the other rollers. In this manner, the possibility exists of undertaking a staggering of the rate of rotation, whereby account may be taken of the strengthening of the mold body increasing in direction of the arrow 18.

The roller conveyor may further have several zones of different inclination and gap width. In this manner, the strengthening- or homogenization-procedure carried out on the roller conveyor, respectively, may still further be improved, as the possibility of a functional division of the roller conveyor exists. Thus in a first zone upon reduction of the gap width to 0 mm. and horizontal conveying direction, very advantageously in addition to a strengthening of the mold bodies, also an agglomeration of an eventually occurring fine-grain-portion may take place. Inclination and gap width of the following zones may be selected to the strength characteristics of the mold bodies attained after passing through this first zone. Desired series of such zones characterized by the parameters adjustable in each case, inclination, gap width and rate of rotation of the rollers, is possible.

We claim:

1. An apparatus for the production of molded bodies comprising:
   a container for holding a slurry,
   a rotatable suction drum partly immersed in said slurry,
   an endless molding belt trained about said drum comprising a plurality of individual molding cavities open at both ends, and
   a roller device capable of agitating and classifying the molded bodies formed on said belt and positioned below said belt to receive molded bodies as they drop from said cavities.

2. An apparatus according to claim 1 in which:
   said roller device is an inclined roller conveyor having an inclination of 0° to 20° to the horizontal, and propelling the molded bodies in a direction substantially at right angles to the direction of movement of said molding belt,
   the rollers in said conveyor each having a diameter of from 15 to 150 mm, and the space between said rollers being 0 to 10 mm.

3. An apparatus according to claim 2 in which:
   said roller conveyor has a variable speed drive, and the space between said rollers and their inclination is adjustable.

4. An apparatus according to claim 2 in which:
   some of the rollers are rotated at different rates of rotation than others of said rollers.

5. An apparatus according to claim 2 in which:
   said roller conveyor has at least two sections of different inclination.

6. An apparatus according to claim 2 in which:
   said roller conveyor has at least two sections of different roller spacing.

* * * * *